Jan. 17, 1928.
E. BUCKINGHAM
1,656,314
TESTING MACHINE FOR THREADED MEMBERS
Filed July 19, 1923
2 Sheets-Sheet 1
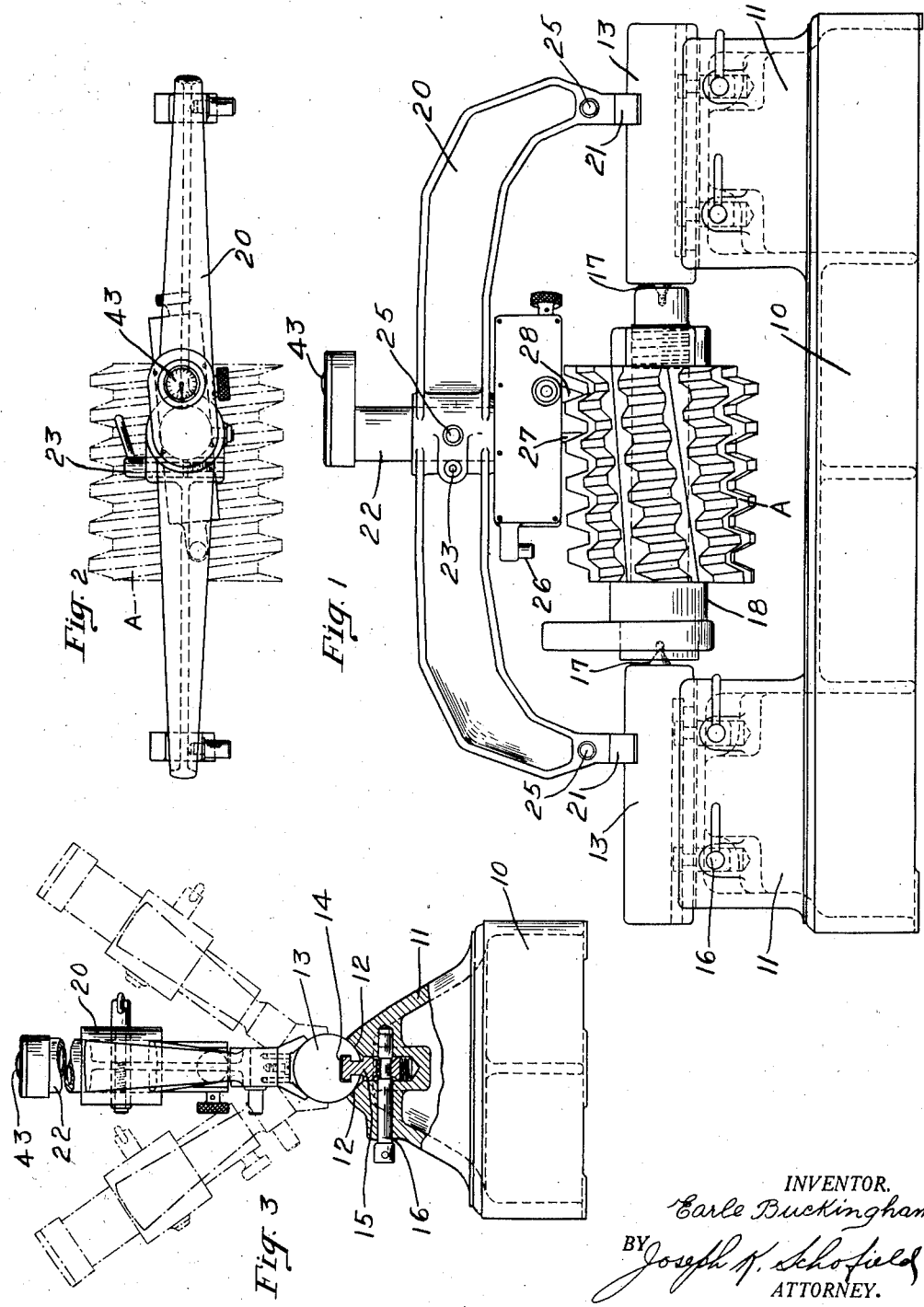
INVENTOR.
Earle Buckingham
BY Joseph K. Schofield
ATTORNEY.

Jan. 17, 1928.
E. BUCKINGHAM
1,656,314
TESTING MACHINE FOR THREADED MEMBERS
Filed July 19, 1923     2 Sheets-Sheet 2
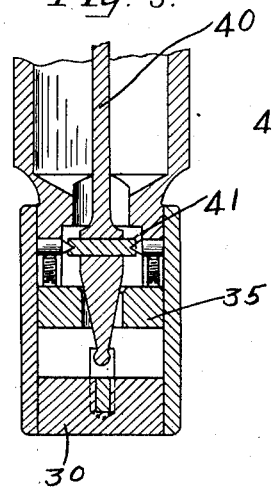
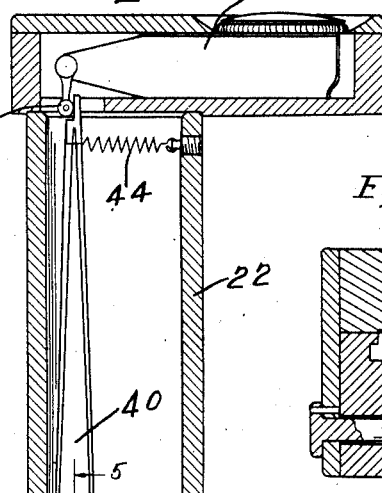
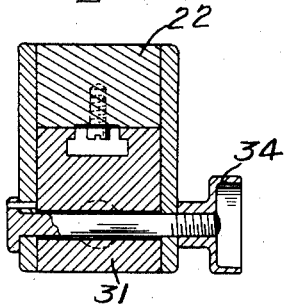
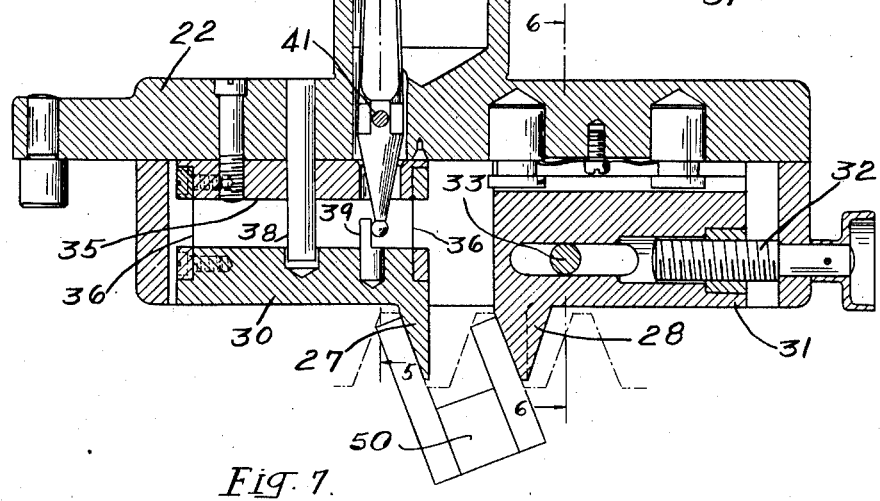
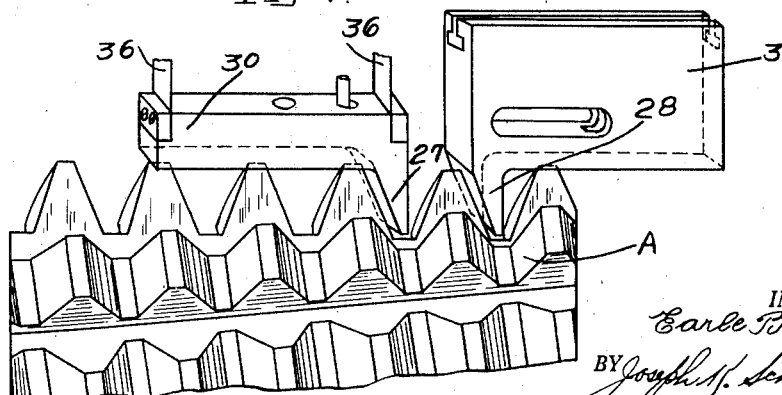
INVENTOR.
Earle Buckingham
BY Joseph M. Schofield
ATTORNEY.

Patented Jan. 17, 1928.

1,656,314

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

TESTING MACHINE FOR THREADED MEMBERS.

Application filed July 19, 1923. Serial No. 652,581.

This invention relates to a testing machine and in particular to a machine or device for testing the precision of screw threads, worms, hobs, and other members which may have a plurality of cutting surfaces arranged thereon either annularly or helically.

An object of the present invention is to provide a machine which will be simple, and easily and quickly operated to determine any errors in spacing, proportion or angle of the threads, or of the cutting surfaces of hobs and other toothed members.

Another object of the invention is to provide a machine or device for mounting the hob or other threaded member being tested so that it may be rotated about its axis, and also to provide a frame having contacting members mounted thereon adapted to be positioned adjustably upon the surfaces of the hob or other threaded member being tested and the positions of these members relatively to each other accurately determined.

Another object of the invention is to provide a mounting for the contacting members permitting them to be angularly adjusted about an axis normal to the axis on which the threaded member being tested is mounted and also to provide means for accurately determining the angular position to which they are adjusted.

Another object of the invention is to provide contacting members so mounted that one of them may be adjustable for different sizes or types of threads on the member being tested and the other one of which may be permitted a limited free movement, and the movements of which may be determined accurately by means of a dial or other form of indicator.

Another object of the invention is to mount the contacting members so that they engage corresponding sides of the threaded portions of the member being tested while angularly adjusted to the particular helix of the threads of the member being tested.

The particular reading obtained by means of the device illustrated is the normal distance between corresponding sides of the thread convolutions, that is, the distance between the blank engaging surface on the contact members. This dimension is obtained in various parts of the threaded member being tested and variations observed. For convenience, I term this distance the "normal pitch" of the threads.

With these and other objects in view, my invention consists in the features of construction and operation set forth in the following specification and illustrated in the accompanying drawings.

In the accompanying drawings annexed hereto and forming a part of this specification, I have shown my invention embodied in a device for testing the precision of the cutting surfaces of a hob, but it will be understood that the invention can be otherwise embodied and that the drawings are not to be construed as defining or limiting the scope of the invention, the claims appended to this specification being relied upon for that purpose.

In the drawings

Figure 1 is a front elevation of the complete device, a hob being shown in position for testing.

Fig. 2 is a plan view of ctrtain parts of the device in operative position relative to a hob.

Fig. 3 is an end view partly in section of the complete device.

Fig. 4 is a vertical sectional view upon an enlarged scale of the body member and contact members.

Fig. 5 is a sectional view upon line 5—5 of Fig. 4.

Fig. 6 is a sectional view taken upon line 6—6 of Fig. 4, and

Fig. 7 is a perspective view of the contacting members in engagement with a hob.

In the above mentioned drawings, I have shown but one embodiment of the invention which is now deemed preferable but it is to be understood that changes and modifications may be made within the scope of the appended claims without departing from the spirit of the invention.

Briefly, and in its broadest aspect, the present invention comprises the following principal parts: First, a base having supporting means for rotatably mounting a hob, or other threaded member to be tested upon its axis; second, a frame adapted to be positioned upon the base and permitted to be moved in a direction exactly parallel to the axis of the hob; third, a body member adjustably mounted within the frame so that it may be moved toward and from the axis of the hob, and also angularly adjusted about an axis normal to the axis of the threaded member being tested; fourth, contact members on said body member, one of which is adjustable and the other permitted a limited free movement; and fifth, an indicator adapted to determine variations in the relative positions of the contact members when in their gaging positions.

Referring more in detail to the figures of the drawings, I provide a base 10 having two heads 11 at opposite ends preferably formed integrally thereon. The upper surfaces of these heads are suitably surfaced to provide ways 12 on which to support two cylindrical members 13 in exact alignment with each other. Means are provided to permit adjustment of these members 13 toward or from each other and permitting them to be clamped in any desired adjustable position. For this purpose, the cylinders 13 are formed with T-slots 14 adapted to be engaged by clamping members 15 which may be drawn downward by eccentrics formed upon rotatable members 16 mounted horizontally within the base. The contiguous ends of these cylinders 13 are provided with centers 17 in exact alignment with the axes of the cylinders. These members 13 and their centers 17 permit a hob A to be suitably mounted upon an arbor 18 so that it may be rotated manually.

A frame 20 shown most clearly in Figs. 1 and 2 is adapted to have its end portions rest upon the upper surfaces of the cylinders 13 and for this purpose the ends of the frame 20 are provided with carefully surfaced members 21 adapted to contact with the cylinders 13 at angularly spaced parts so that this frame 20 may be held in position extending precisely parallel with the axis of the hob A. In the central portion of the frame is a body member 22 which preferably is adjustably mounted within a hole extending exactly normally to the axis of the hob A about which the frame 20 may swing. Clamping means in the form of a clamping screw 23 is provided so that this body member 22 may be secured in any desired adjusted position.

The body member 22 is sufficiently elongated so that it may be moved within the hole in the frame 20 directly toward or from the cylindrical surface of the hob A or other member being tested. The body member 22 may also be angularly adjusted about the axis of the hole within which it is located. This adjustment must be accurately made so that the body member 22 will be positioned with surfaces of its contacting members disposed exactly tangent to the helicoidal surfaces of the parts being tested. In order to accomplish this adjustment quickly and to a high precision, I provide three fixed buttons 25 upon one side of the frame 20, the end surfaces of these buttons being in and determining a single plane. The body member 22 at one end is provided with a projection having a button 26 outstanding therefrom. By placing the frame 20 upon a surface plate with the buttons 25 resting thereon and adjusting the body member 22 angularly so that the cylindrical surface of the button 26 on the body member will be at a predetermined elevation from the surface plate (determined by any appropriate means such as measuring blocks), the body member 22 may be adjusted to any desired angle. This angle is determined by the distance of the button 26 on the body member 22 from the central axis of the body member 22 and from the position of the three fixed buttons 25 relative to the axis of the frame 20. With the angular position of body member 22 known for one position of all of the buttons, other angular positions may readily be calculated.

With the body member 22 adjusted as above described and clamped in its adjusted angular and vertical position, it may be positioned as shown in Fig. 1 so that its two contact members 27 and 28 engage corresponding sides of adjacent teeth or other parts of the member A being tested. These contact members 27 and 28 which are more clearly shown in Fig. 4 are mounted on small carriers 30 and 31 respectively and are provided with obliquely disposed surfaces which, in the preferred form, are plane. These oblique surfaces on the two contacting members 27 and 28 are in exact parallelism with each other and are adapted to directly engage respectively the surfaces of the member being tested. These members 27 and 28 also are of considerable width and their surfaces are accurately surfaced to perfect planes.

As shown in Fig. 4, one of these contact members 28 is mounted upon its carrier 31 so that it is adapted to be adjusted toward and from the other by a screw 32 and may be clamped in any adjusted position by a bolt 33 extending transversely through the body member and having a knurled nut 34 at one end. The opposite contact member 27 is preferably integrally formed upon one end of its plate or carrier 30 which is mounted relative to another carrier 35 by means of two flat thin plates 36. The carrier 35 is fastened to the body member 22 in any preferred manner. This mounting of the contacting member 27 permits the carrier 30 bearing the contact member to be moved resiliently toward and from the opposite contact member. A pin 38 mounted within the body member 22 and entering a hole of slightly greater diameter in the carrier 30 bearing the contact member 27 limits the amount of movement of this contact member so that any injury to the parts is prevented.

In order to determine the relative positions of these two contract members 27 and 28 when they are in their gaging positions, a pin 39 flattened upon one side is mounted upon the carrier 30 bearing the contact member 27. This pin 39 is in engagement with the lower end of an elongated lever 40. The lever 40 is adapted to oscillate about a pivot 41 shown most clearly in Fig. 5, and its upper end is in contact with the movable member 42 of a dial or other form of indicator 43. A light spring 44 attached to the lever 40 holds it and the contact member 27 in one limited position of their adjustment.

As the normal distance between the inclined surfaces of the contacting members for each adjustment of these members is required, special means are provided for determining this distance. Gages 50, one of which is shown in position in Fig. 4, are made, the distance between an outside surface and one inside surface of which equals the desired dimension. With a gage 50 of this type engaging the contacting members, the indicators 43 may be adjusted so that its pointer is over the zero of the graduation on its dial. With the contact members 27 and 28 so adjusted, variations of their positions when in engagement with different portions of member A will be indicated by the pointer coinciding with different graduations.

In the embodiment of the invention illustrated, the contacting members 27 and 28 have their inclined surfaces at 20° from a line normal to the axis of rotation of the member being tested. It is obvious that for testing members having surfaces at widely different angles, other contacting members and carriers may be substituted.

In using this device, the hob A or other member being tested is mounted upon the centers 17 as shown in Fig. 1 so that it may be rotated manually. The frame 20 carrying the body member 22 and contacting members 27 and 28 is then placed upon the upper surfaces of the cylinders 13 and the body member 22 adjusted vertically so that the contacting members 27 and 28 are at the correct distance from the axis of the member A. The body member 22 carrying the contacting members 27 and 28 is also adjusted angularly to the correct position for the helix of the threads being tested as described above.

With the body member 22 adjusted, the frame 20 is carefully located upon the cylinders 13 so that the contacting member 28 contacts with one of the lateral surfaces of the member being tested. The frame 20 is then oscillated slightly back and forth until the other contacting member 27 correctly engages a surface corresponding to the one engaged by the first contacting member 28. With the frame 20 retained in this position, the position of the pointer on the indicator 43 is noted. The frame 20 is then removed from that testing position and placed either to the left or right so that the contacting members 27 and 28 engage other portions of the member A. The frame 20 is adjusted as in the previous instance so that the contacting members 27 and 28 correctly engage the portions of the surfaces being tested and other readings of the indicator are taken. This operation may be repeated a number of times so that each of the parts of the member being tested extending longitudinally of the member are carefully determined. The operation may then be continued after rotating the member being tested through a small angle.

I have shown this invention applied to the examination of a hob having a plurality of teeth, the front cutting surfaces of which are arranged upon helicoidal or axially inclined surfaces. It will be understood, however, that threaded members without teeth may be examined and their precision determined by the use of the above described device.

What I claim is:

1. A testing device for threaded members comprising in combination, a base, supporting means on the base for the member being tested, a frame mounted on and movable relative to said supporting means, a body member mounted in said frame and movable bodily in a direction normal to the axis of the member being tested, and contacting members on said body member so mounted thereon that they are relatively movable toward and from each other.

2. A testing device for threaded members comprising in combination, a base, supporting means on the base for the member being tested, a frame supported on said means and adapted to be moved relative to said supporting means, a body member mounted in said frame and movable bodily in a direction toward and from the axis of the member being tested and angularly about an axis normal to said direction, and contacting members on said body member so mounted that they are relatively movable toward and from each other.

3. A testing device for threaded members comprising in combination, a base, means on said base for supporting the member being tested whereby it may be rotated about its axis, a frame supported on said base, a body member on said frame and having contacting members thereon adapted to engage corresponding surfaces of adjacent portions of the member being tested, means for mounting said body member permitting movement of said body member and contacting members in a direction parallel to the axis of the member being tested, and means on said body member permitting relative movement of the contacting members toward and from each other.

4. A testing device for threaded members comprising in combination, a base, means on said base for supporting the member being tested whereby it may be rotated about its axis, a frame supported on said base, a body member on said frame and having contacting members thereon adapted to engage corresponding surfaces of adjacent portions of the member being tested, means permitting adjustment of the contacting members about an axis normal to the axis of the member being tested, means permitting movement of said body member and contacting members in a direction parallel to the axis of the member being tested, and means on the body member permitting relative movement of the contacting members toward and from each other.

5. A testing device for threaded members comprising in combination, a base, means on said base for supporting the member being tested whereby it may be rotated about its axis, a frame supported on said base, a body member on said frame and having contacting members thereon adapted to engage corresponding surfaces of adjacent portions of the member being tested, and means on said body member to determine the distance apart of said contacting members when in there gaging positions.

6. A testing device for threaded members comprising in combination, a base, means on said base for supporting the member being tested whereby it may be rotated about its axis, a frame supported on said base, a body member on said frame and having contacting members thereon adapted to engage corresponding surfaces of adjacent portions of the member being tested, means permitting adjustment of said body member and contacting members about an axis, and means to determine the relative positions of said contacting members when in their gaging positions.

7. A testing device for threaded members comprising in combination, a base, means on said base for supporting the member being tested whereby it may be rotated about its axis, a frame supported on said base, a body member on said frame and having contacting members thereon adapted to engage corresponding surfaces of adjacent portions of the member being tested, means permitting adjustment of said body member and contacting members about an axis normal to the axis of the member being tested, and means to determine the relative positions of said contacting members when in their gaging positions.

8. A testing device for threaded members comprising in combination, a base, means on said base for supporting the member being tested whereby it may be rotated about its axis, a frame supported on said base, and a body member on said frame having contacting members adapted to engage corresponding surfaces of adjacent portions of the member being tested, said frame being movable relative to the member being tested so that the contacting members may be positioned to engage different portions thereof.

9. A testing device for threaded members comprising in combination, a base, means on said base for supporting the member being tested whereby it may be rotated about its axis, a frame supported on said base, a body member on said frame having contacting members adapted to engage corresponding surfaces of adjacent portions of the member being tested, said frame being movable on said base so that the contacting members may be positioned to engage different portions of the member being tested, and means on said body member permitting adjustment of the position of said gaging members toward or from the axis of the member being tested.

10. A testing device for threaded members comprising in combination, a base, means on said base for supporting the member being tested whereby it may be rotated about its axis, a frame supported on said base, a body member on said frame having contacting members adapted to engage corresponding surfaces of adjacent portions of the member being tested, means permitting adjustment of the position of said contacting members about an axis, and means permitting adjustment of said frame so that the body member and contacting members may be positioned to engage different axial portions of the member being tested.

11. A testing device for threaded members comprising in combination, a base, means on the base for supporting the member being tested whereby it may be rotated about its axis, a frame mounted on said base so that it may be moved in a direction parallel to the axis of the member being tested, a body member thereon, contacting members on said body member adapted to engage corresponding surfaces of adjacent portions of the member being tested, and means to determine the relative positions of said contacting members when in their gaging positions.

12. A testing device for threaded members comprising in combination, a base, means on said base for supporting the member being tested whereby it may be rotated about its axis, a frame mounted on said base so that it may be moved in a direction parallel to the axis of the member being tested, a body member thereon, contacting members on said body member adapted to engage corresponding surfaces of adjacent portions of the member being tested, means on the frame permitting adjustment of the position of said contacting members about an axis, and means to determine the distance apart of said contacting members when in their gaging positions.

13. A testing device for threaded members comprising in combination, a base, means on said base for supporting the member being tested whereby it may be rotated about its axis, a frame mounted on said base so that it may be moved in a direction parallel to the axis of the member being tested, a body member thereon, contacting members on said body member adapted to engage corresponding surfaces of adjacent portions of the member being tested, means on the frame permitting adjustment of the position of said contacting members about an axis normal to the axis of the member being tested, and means on the frame to determine the distance apart of said contacting members when in their gaging positions.

14. A testing device for threaded members comprising in combination, a base, supporting means on said base for the member being tested, a frame, contacting members, means for supporting said contacting members on said frame, said contacting members having plane surfaced sides adapted to engage corresponding surfaces of adjacent portions of the member being tested, and means permitting movement of said frame and contacting members in a direction parallel to the axis of the member being tested.

15. A testing device for threaded members comprising in combination, a base, supporting means on said base for the member being tested, a frame, contacting members, means for adjustably supporting said contacting members on said frame, said contacting members having plane surfaced sides adapted to engage corresponding surfaces of adjacent portions of the member being tested, means to adjust one of said contacting members toward and from the other, and means permitting a limited free movement of the other of said contacting members.

16. A testing device for threaded members comprising in combination, a base, supporting means on said base for the member being tested whereby it may be rotated about its axis, a frame, contacting members, means for adjustably supporting said contacting members on said frame, said contacting members having plane surfaced sides adapted to engage corresponding surfaces of adjacent portions of the member being tested, and means on said frame to determine the relative positions of said contacting members when in their gaging positions.

17. A testing device for threaded members comprising in combination, a base, supporting means on said base for the member being tested whereby it may be rotated about its axis, a frame, contacting members, means for adjustably supporting said contacting members on said frame, said contacting members having plane surfaced sides adapted to engage corresponding surfaces of adjacent portions of the member being tested, means on the frame permitting adjustment of the position of said contacting members about an axis, and means on said frame to determine the distance apart of said contacting members when in their gaging positions.

18. A testing device for threaded members comprising in combination, a base, supporting means on said base for the member being tested whereby it may be rotated about its axis, a frame, contacting members, means for adjustably supporting said contacting members on said frame, said contacting members having plane sides inclined in the same direction and adapted to engage corresponding side surfaces of adjacent portions of the member being tested, means permitting the contacting members to be positioned upon different portions of the member being tested, and means on said frame to determine the distance apart of said contacting members when in their gaging positions.

19. A testing device for threaded members comprising in combination, a base, supporting means on said base for the member being tested whereby it may be rotated about its axis, a frame, contacting members, means for supporting said contacting members on said frame, said contacting members having plane sides inclined in the same direction and adapted to engage corresponding side surfaces of adjacent portions of the member being tested, means on the frame permitting adjustment of said contacting members relative to the axis of the member being tested, means permitting the contacting members to be positioned upon different portions of the member being tested, and means on said frame to determine the relative positions of said contacting members when in their gaging positions.

20. A testing device for threaded members comprising in combination, a base, supporting means on said base for the member being tested whereby it may be rotated about its axis, a frame, contacting members supported thereon having plane sides inclined in the same direction and adapted to engage corresponding side surfaces of adjacent portions of the member being tested, means on the frame permitting adjustment of said contacting members about an axis normal to the axis of the member being tested, means permitting the contacting members to be positioned upon different portions of the member being tested, and means on said frame to determine the relative positions of said contacting members when in their gaging positions.

21. A testing device for threaded members comprising in combination, a base, supporting means on said base for the member being tested whereby it may be rotated about its axis, a frame supported on said base and adapted to be positioned at different axial positions relative to the member being tested, a body member on said frame, means on the frame permitting adjustment of said body member, contacting members on said body members, and means on said body member to determine the relative positions of said contacting members when in their gaging positions.

22. A testing device for threaded members comprising in combination, a base, supporting means on said base for the member being tested whereby it may be rotated about its axis, a frame supported on said base and adapted to be positioned at different axial positions relative to the member being tested, a body member on said frame, means on the frame permitting adjustment of said body member about an axis normal to the member being tested, contacting members on said body member, and means on said body member to determine the relative positions of said contacting members when in their gaging positions.

23. A testing device for threaded members comprising in combination, a base, supporting means on said base for the member being tested whereby it may be rotated about its axis, a frame supported on said base and adapted to be positioned at different axial positions relative to the member being tested, a body member on said frame, means on said frame permitting angular and axial adjustment of said body member, contacting members on said body member, means on the body member to adjust the position of one of said contacting members, means permitting a limited free movement of the other of said contacting members, and means on said body member to determine the relative positions of said contacting members when in their gaging positions.

In testimony whereof, I hereto affix my signature.

EARLE BUCKINGHAM.